(12) United States Patent
Jessberger et al.

(10) Patent No.: US 8,747,718 B2
(45) Date of Patent: Jun. 10, 2014

(54) PLASTIC HOLLOW PART AND METHOD FOR THE MANUFACTURE THEREOF

(75) Inventors: Thomas Jessberger, Asperg (DE); Markus Hanselmann, Laufeen a. N. (DE); Horst Danneberg, Bad Sachsa (DE); Guido Regener, Klein Denkte (DE); Maik Hentschel, Bobeck (DE)

(73) Assignee: Mann+Hummel GmbH, Ludwigshafen (DE)

( * ) Notice: Subject to any disclaimer, the term of this patent is extended or adjusted under 35 U.S.C. 154(b) by 28 days.

(21) Appl. No.: 13/131,639

(22) PCT Filed: Nov. 26, 2009

(86) PCT No.: PCT/EP2009/065886
§ 371 (c)(1),
(2), (4) Date: Jun. 21, 2011

(87) PCT Pub. No.: WO2010/060954
PCT Pub. Date: Jun. 3, 2010

(65) Prior Publication Data
US 2011/0236613 A1    Sep. 29, 2011

(30) Foreign Application Priority Data
Nov. 27, 2008  (DE) .......................... 10 2008 059 411

(51) Int. Cl.
*B29C 45/14*    (2006.01)
*B29C 49/20*    (2006.01)

(52) U.S. Cl.
USPC ........ 264/261; 264/271.1; 264/277; 264/274; 264/279.1; 264/516

(58) Field of Classification Search
None
See application file for complete search history.

(56) References Cited

U.S. PATENT DOCUMENTS

| 4,179,142 A | 12/1979 | Schopp |
| 4,427,219 A | 1/1984 | Madej |
| 2006/0073671 A1 | 4/2006 | Iinuma |

FOREIGN PATENT DOCUMENTS

| DE | 2112835 A | 9/1972 |
| DE | 602004004462 | 1/2008 |
| DE | 102006051774 A1 | 5/2008 |
| FR | 2459121 A1 | 1/1981 |
| JP | 2004293587 A | 10/2004 |

OTHER PUBLICATIONS

PCT search report of PCT/EP2009/065886; German DPMA search report of DE10 2008 059 411.3.

*Primary Examiner* — Monica Huson
(74) *Attorney, Agent, or Firm* — James Hasselbeck

(57) ABSTRACT

The invention relates to a plastic hollow part (1) and to a method for the manufacture of a plastic hollow part, wherein plastic material is introduced into a molding tool by means of a blowing or injection molding process, forming a hollow connection contour (10) and the plastic is formed into a hollow part (1), wherein a support ring (4) is molded into the area of the connection contour (10).

6 Claims, 1 Drawing Sheet

PLASTIC HOLLOW PART AND METHOD FOR THE MANUFACTURE THEREOF

CROSS REFERENCE TO RELATED APPLICATIONS

This application is US National Stage Entry of international patent application no. PCT/EP2009/065886, filed Nov. 26, 2009 designating the United States of America. Priority is claimed based on Federal Republic of Germany patent application no. 10 2008 059 411.3, filed Nov. 27, 2008, the entire disclosure of which is incorporated herein by reference.

TECHNICAL FIELD

The invention concerns a method for manufacturing a plastic hollow part in which, by means of a blowing or injection process, plastic material is introduced into a mold with formation of a hollow connecting contour and is formed to the hollow part. The invention concerns also a plastic hollow part with a terminal connecting contour for attaching an attachment part and with a support element arranged on the connecting contour. The plastic hollow part is in particular provided for allowing fluids to pass through, such as intake air or liquids, but is not limited to this.

BACKGROUND OF THE INVENTION

In order to connect, for example, elastomer hoses to plastic hollow parts, often hose clamps are used in order to ensure operationally safe seal-tightness between the two components. The plastic hollow parts to which the elastomer hoses are attached have a connecting contour for allowing fluids to pass through, onto which the hose ends are pushed. Since plastic materials when exposed to permanent force action have the tendency to relax, a support ring of metal is inserted on the inner side of the plastic component. The hose clamp is supported on this support ring and clamps the elastomer hose as well as the connecting contour. Since the inner contour of the plastic component, generally manufactured as a blow-molded part, has relatively large tolerances because of its manufacture, the receiving contour for the support ring arranged on the inner circumference of the connecting contour is mechanically reworked. This mechanical reworking is done by a cuttings-producing machining process, for example, by stepped drilling or drill-finishing.

In all cutting reworking processes cuttings of different characteristics are produced. Since the cuttings cannot be removed in a reliable way, there is the risk that some of the cuttings remain within the component. In some applications cuttings that remain may not be problematic; in connection with use of the components in clean air applications, cuttings are however not acceptable because they may be transported directly to the internal combustion engine and may cause damage thereat. For example, deposits on or damage of the turbo charger may occur which may lead to failure of the turbo charger. When using plastic materials with a fiberglass component, deposits of the glass fibers originating from the cuttings may occur between the piston ring and the cylinder liner which causes leakage and therefore performance loss of the engine.

SUMMARY OF THE INVENTION

The object of the invention is to provide a method for manufacturing a plastic hollow part as well as a plastic hollow part with which a hazard to downstream components is precluded and which enables a fast and reliable manufacture.

According to the invention, this object is solved by a method with the features of claim 1 and a plastic hollow part with the features of claim 9. Advantageous configurations and further embodiments of the invention are disclosed in the respective dependent claims.

The method according to the invention for producing a plastic hollow part, where plastic material is introduced by means of a blow-molding or injection-molding process into a mold with formation of a hollow connecting contour and is formed to a hollow part, provides that a support ring is embedded in the area of the connecting contour.

Embedding of the support ring makes obsolete a cutting reworking action of the plastic hollow part or the connecting contour so that, on the one hand, a stable attachment of the attachment part on the connecting contour and a securing action by a hose clamp or the like can be realized in a reliable fashion over an extended period of time. By avoiding cuttings in connection with introducing or attaching the support element, it is ensured that the downstream components in the mounted state are not exposed to any hazard by plastic materials or glass fibers.

One variant of the invention provides that the support ring before introduction of the plastic material is inserted into the mold, i.e., into the injection mold or blow mold, and is surrounded from the interior with plastic material. The support ring thus forms the outer termination and outer circumference at least of a portion of the connecting contour whereby in an especially effective way a high dimensional precision of the connecting contour is defined because the support ring generally is made of a metal that has a high dimensional stability.

One variant of the invention provides that the support ring is inserted into an injection mold together with a plastic hollow part with formation of a cavity and is secured positionally relative to the plastic hollow part. Subsequently, into the cavity between the support ring and the plastic hollow part, a filler material is introduced that is provided for filling the cavity. Subsequently, the finished plastic hollow part is removed from the injection mold. The support ring is positioned at the inner circumference of the connecting contour while the filler material, on the one hand, effects a form-fitting and fused-bond securing action of the support ring on the plastic hollow part, more precisely of the connecting contour and, on the other hand, compensates tolerances between the outer contour of the support ring and the inner contour of the connecting contour. These tolerances exist because the inner contour of a plastic hollow part produced by a blow molding or injection molding process is subject to certain fluctuations.

For safely positioning the support ring within the connecting contour and relative to the plastic hollow part, it is provided that the support ring is secured on a split that is moved in a direction toward the plastic hollow part. Preferably, the split is moved toward the plastic hollow part until the split rests on the plastic hollow part so that no filler material can penetrate into the plastic hollow part beyond the split. The melting point of the filler material can be selected in this connection such that the surface of the plastic hollow part is melted so that both materials will form a fused bond with each other. In this connection, the support ring is arranged within the plastic hollow part and is surrounded from the exterior with the filler material; preferably, the support ring is resting snuggly on the split so that no filler material can penetrate between the split and the support ring; the support ring thus forms the inner termination of the connecting contour.

As an alternative, or in addition, to the fused bond between the filler material and the material of the plastic hollow part, it is provided that shrinkage of the two materials are matched to each other such that the post-shrinkage of the plastic hollow part and of the connecting contour is greater than shrinkage of the filler material. In this way, the support ring and the filler material within the plastic hollow part and the connecting contour are shrink-fit during cooling.

Basically, it is also possible that in the plastic hollow part in the area of the connecting contour at least one undercut is formed that is at least partially filled by the filler material so that, in addition to the fused-bond and frictional connection and securing action of the filler material in the connecting contour and thus of the support ring in the connecting contour, also a form-fit securing action can be realized.

The plastic hollow part according to the invention with a terminal connecting contour for connecting an attachment part and a support element arranged on the connecting contour provides that the support element is arranged on the inner circumference of the connecting contour and that between the support element and the plastic hollow part a filler material is injected that secures the support element to the connecting contour. In a further embodiment, at least one undercut is provided in the connecting contour into which the filler material is injected; preferably, the undercut is filled out by the filler material so that a form-fit connection between the filler material and the plastic material of the plastic hollow part is formed.

BRIEF DESCRIPTION OF THE DRAWINGS

In the following, embodiments of the invention will be explained with the aid of the drawings in more detail. It is shown in.

DETAILED DESCRIPTION

Figure 1:
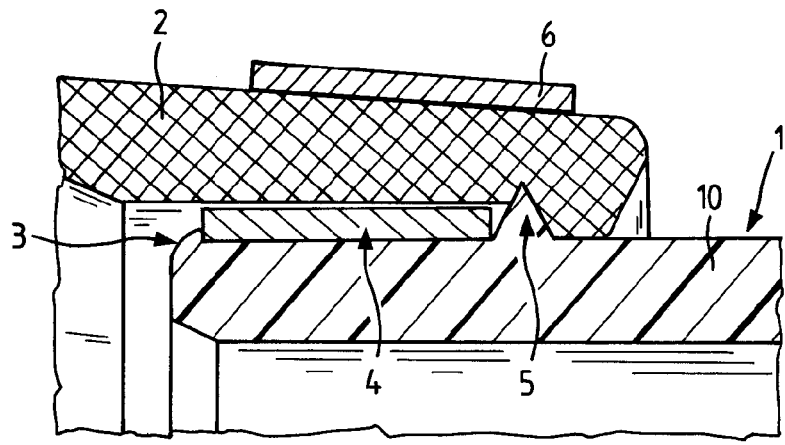
FIG. 1 a schematic detail view of a connecting contour in section illustration.

In FIG. 1, a plastic hollow part 1 with a connecting contour 10 and an attachment part 2 in the form of an elastomer hose mounted thereat is illustrated. The elastomer hose 2 is pushed across the connecting contour 10 that is, for example, embodied as a socket or a flange and serves for connecting the elastomer hose 2 to the plastic hollow part 1. The plastic hollow part 1 is preferably embodied as a blow-molded plastic part and has an inwardly positioned hollow space that is provided in particular for allowing fluids such as intake air or the like. On the connecting contour 10 a securing contour 3 is provided at the end face and, in the illustrated embodiment, is formed as a circumferentially extending rim. The securing contour 3 can also be configured in the form of individual radially extending projections so that there is no circumferentially extending web but interrupted web sections are present at the end face of the connecting contour 10. The securing contour 3 can be formed together with the plastic hollow part 1 in the blow mold or can be subsequently applied, for example, by thermal embossment or by injection molding. At an axial spacing relative to the securing contour 3, a sealing shoulder 5, in the present case a circumferentially extending sealing shoulder 5, is formed on the plastic hollow part 1 and the connecting contour 10. The circumferentially extending sealing shoulder has a triangular cross-section and has a certain radial extension away from the connecting contour 10. Between the securing contour 3 and the sealing shoulder 5 there is a support element 4 in the form of a support ring arranged on the connecting contour 10. The support ring 4 is positioned on the outer circumference of the connecting contour 10 and serves for receiving radially acting forces. The support ring 4 can be mounted by press fit externally on the plastic hollow part 1; it is also possible that the support ring 4 is embedded externally on the connecting contour 10 in that the support ring 4, before blowing in the plastic material, is inserted into the blow mold and is at least partially surrounded by the plastic material.

The attachment part 2 in the form of the elastomer hose extends across the securing contour 3, the support ring 4, and the circumferentially extending sealing shoulder 5 and is secured on the connecting contour 10 by a clamp 6, in the present case a hose clamp. The hose clamp 6 is arranged in the present embodiment such that it is arranged axially past the sealing shoulder 5 and presses the attachment part 2 in the direction toward the sealing shoulder 5. In this way, the sealing shoulder 5, embodied with an acute angle, is forced into the attachment part 2 so that a partial form-fit action is generated that increases the removal forces between the attachment part 2 and the plastic hollow part 1. The hose clamp 6 is also arranged above the support element 4 so that the attachment part 2 is clamped between the support element 4 and the hose clamp 6. By means of the very precise determination of the outer contour of the connecting contour 10 by the blow mold, generally reworking of the contact surface of the support ring 4 on the connecting contour 10 will not be necessary. The support ring 4 can be pushed from the exterior onto the connecting contour 10 until it rests against the sealing shoulder 5. The securing contour 3 secures the support ring 4 against falling off or sliding off during transport prior to mounting.

As an alternative to a hose clamp, other securing elements can be provided also that secure the attachment part 2 on the connecting contour 10 and exert radially acting forces onto the connecting contour 10. The securing contour 3 can also be generated after pushing on the support ring, for example, by thermal embossment.

Figure 2:
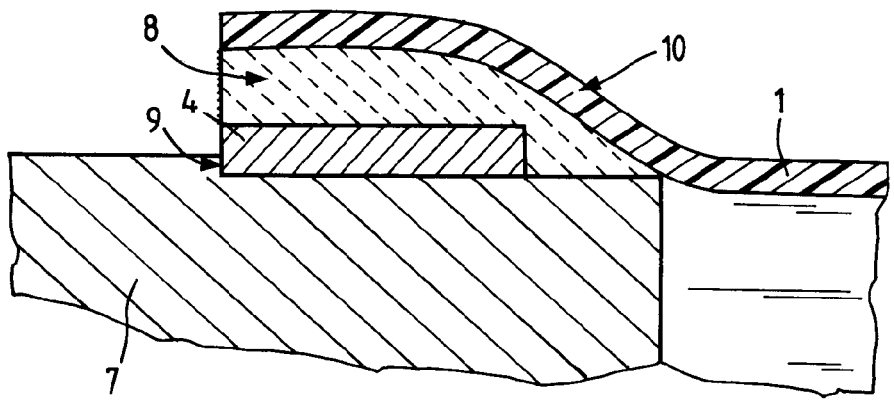
FIG. 2 a detail view in section illustration of a connecting contour with filler material for tolerance compensation; as well as FIG. 3 a variant of FIG. 2.

In FIG. 2, a variant of the invention with a connecting contour 10 is illustrated that in the illustrated embodiment has no circumferentially extending sealing shoulder and no externally positioned support ring. Also, the attachment part is not illustrated that is embodied, for example, as an elastomer hose. Illustrated is the plastic hollow part 1 in an injection mold, not illustrated in detail, with an inwardly positioned split 7 that contacts seal-tightly the end face of the plastic hollow part 1. Between the split 7 and the inner contour of the connecting contour 10 there is a cavity that is filled with filler material 8. The filler material 8 serves, on the one hand, as a tolerance compensation between the inwardly arranged support ring 4 and the inner contour of the connecting contour 10 and, on the other hand, as a securing means for the support ring 4 on the plastic hollow part 1. After the split 7 on which the support ring 4 is arranged and axially supported on shoulder 9 has been moved against the plastic hollow part 1, a filler material 8, preferably of plastic material, is injected into the cavity between the outer circumference of the support ring 4 and the inner circumference of the connecting contour 10. For a safe securing action of the support ring 4 and for elimination of play, the melting point of the filler material 8 can be selected such that the plastic material of the plastic hollow part 1 is partially melted. In this way, the two materials can form a bond with each other so that the filler material 8 is secured by a fused bond on the plastic material of the connecting contour 10.

The split 7 seals in this connection the plastic hollow part 1 relative to penetration of the filler material 8 that is introduced by an injection or casting process. The support ring 4 is securely held within the filler material 8, for example, in that on its outer contour undercuts or the like are provided which are surrounded by the filler material 8. Also, by means of a shrinking process of the filler material, the support ring 4 can be secured safely in the filler material 8. As an alternative to a fused-bond connection between the filler material 8 and the plastic material of the connecting contour 10, it is possible to match shrinkage of both materials relative to each other such that upon cooling of the finished plastic hollow part 1 the plastic material of the connecting contour 10 will shrink more than the filler material 8 so that the support ring 4 as well as the filler material 8 are connected by shrink fit in the component upon cooling. Since the support ring 4 in general is produced of metal, the shrinkage upon cooling generally is significantly less than that of the filler material 8 and of the plastic hollow part 1 so that the support ring 4 is additionally secured by shrink fit.

Figure 3:
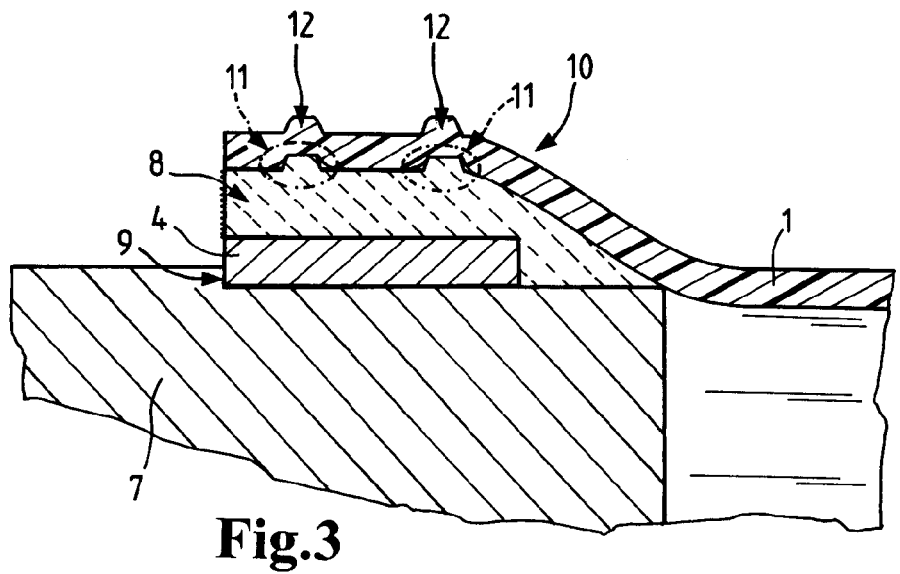

In FIG. 3 a variant of the invention is illustrated that is to be used as an alternative or in addition to the fused-bond variant according to FIG. 2 and that provides undercuts 11 in the area of the inner circumference of the connecting contour 10. These undercuts 11 can be produced by embossing, wherein on the outer circumference of the connecting contour form-fit elements 12, for example, as circumferentially extending rings, can be formed that may serve for securing the attachment part that is not illustrated. Into the undercuts 11 the filler material 8 is cast or injected so that an additional securing action against outward sliding of the filler material and thus of the support ring 4 out of the connecting contour 10 is realized.

In the variants according to FIGS. 2 and 3, securing shoulders and sealing shoulders can be provided also. The geometry of the support ring 4 is not limited to a circular ring; other contours of the support ring may also be provided when this is required by the connecting contour.

The invention claimed is:

1. A method of producing a plastic hollow part, comprising:
   providing an injection mold suitable for a blow-molding or injection molding process;
   inserting an annular support ring into said mold;
   inserting said hollow part into said mold in an interior of said annular support ring, with formation of a cavity between a connecting contour of said plastic hollow part and said support;
   securing positionally said support ring in said mold relative to said plastic hollow part in said mold;
   introducing a plastic filler material into said cavity by means of said blow-molding or said injection molding process to fill out said cavity;
   embedding said annular support ring into said connecting contour proximate to an end face of said hollow part by at least partially surrounding said annular support ring with said plastic filler material;
   wherein said securing positionally step includes the step of securing said support ring onto an outer surface of a split component;
   wherein before said introducing step the method further includes the step of moving said split component with said support ring into and against an interior of said plastic hollow part.

2. The method of producing a plastic hollow part according to claim 1, wherein
   in said moving step said support ring is arranged within said plastic hollow part and is surrounded about a radially outer exterior surface of said support ring with said filler material.

3. The method of producing a plastic hollow part according to claim 1, wherein
   said method further includes the step of melting a filler material;
   wherein in said filling step further includes the steps of
      melting at least partially said interior of said hollow part by said molten filler material;
      fuse-bonding said filler material to said interior of said hollow part by solidify said melted filler material together with said partially melted interior of said hollow part to form a fuse-bonded connection between said filler material and said hollow part.

4. The method of producing a plastic hollow part according to claim 1, wherein
   said introducing step includes the step of
      shrinking said filler material surrounding said support ring, said shrinking securing said support ring into said filler material and onto said split component.

5. A method of producing a plastic hollow part, comprising:
   providing an injection mold suitable for a blow-molding or injection molding process;
   inserting an annular support ring into said mold;
   inserting said hollow part into said mold in an interior of said annular support ring, with formation of a cavity between a connecting contour of said plastic hollow part and said support;
   securing positionally said support ring in said mold relative to said plastic hollow part in said mold;
   introducing a plastic filler material into said cavity by means of said blow-molding or said injection molding process to fill out said cavity;
   embedding said annular support ring into said connecting contour proximate to an end face of said hollow part by at least partially surrounding said annular support ring with said plastic filler material;
   wherein after said embedding step the method further comprises:
      shrinking said filler material surrounding said support ring, said shrinking securing said support ring into said filler material.

6. A method of producing a plastic hollow part, comprising:
   providing an injection mold suitable for a blow-molding or injection molding process;
   inserting an annular support ring into said mold;
   inserting said hollow part into said mold in an interior of said annular support ring, with formation of a cavity between a connecting contour of said plastic hollow part and said support;
   securing positionally said support ring in said mold relative to said plastic hollow part in said mold;
   introducing a plastic filler material into said cavity by means of said blow-molding or said injection molding process to fill out said cavity;
   embedding said annular support ring into said connecting contour proximate to an end face of said hollow part by at least partially surrounding said annular support ring with said plastic filler material;
   wherein before said inserting said hollow part step, said method further includes the step of
      forming at least one undercut into an interior surface of said hollow part;

wherein said introducing step includes the step of filling said at least one undercut with said filler material.

* * * * *

UNITED STATES PATENT AND TRADEMARK OFFICE
CERTIFICATE OF CORRECTION

PATENT NO. : 8,747,718 B2  
APPLICATION NO. : 13/131639  
DATED : June 10, 2014  
INVENTOR(S) : Jessberger et al.

Page 1 of 1

It is certified that error appears in the above-identified patent and that said Letters Patent is hereby corrected as shown below:

Title page

Item (75) Inventors, delete "Laufeen", and insert --Lauffen--.

Signed and Sealed this  
Thirty-first Day of March, 2015

Michelle K. Lee  
*Director of the United States Patent and Trademark Office*